(12) United States Patent
Ashmore et al.

(10) Patent No.: US 9,134,045 B2
(45) Date of Patent: Sep. 15, 2015

(54) MODULAR SOLAR SUPPORT ASSEMBLY

(75) Inventors: Erryn Ashmore, Berkley, MI (US); Sten Burris, Oxford, MI (US); Gary Banasiak, Troy, MI (US); Dinesh Mahadevan, Rochester Hills, MI (US)

(73) Assignee: Magna International Inc., Aurora, Ontario (CA)

( * ) Notice: Subject to any disclaimer, the term of this patent is extended or adjusted under 35 U.S.C. 154(b) by 336 days.

(21) Appl. No.: 13/703,019

(22) PCT Filed: Jun. 24, 2011

(86) PCT No.: PCT/US2011/041771
§ 371 (c)(1),
(2), (4) Date: Mar. 5, 2013

(87) PCT Pub. No.: WO2011/163563
PCT Pub. Date: Dec. 29, 2011

(65) Prior Publication Data
US 2013/0153519 A1    Jun. 20, 2013

Related U.S. Application Data

(60) Provisional application No. 61/358,225, filed on Jun. 24, 2010.

(51) Int. Cl.
*F24J 2/54* (2006.01)
*F24J 2/52* (2006.01)

(52) U.S. Cl.
CPC .................. *F24J 2/54* (2013.01); *F24J 2/5232* (2013.01); *F24J 2/542* (2013.01); *F24J 2002/5216* (2013.01); *Y02E 10/47* (2013.01)

(58) Field of Classification Search
CPC ............. F24J 2/5232; F24J 2/542; F24J 2/54; F24J 2002/5216; Y02E 10/47
USPC ....................................................... 250/203.4
See application file for complete search history.

(56) References Cited

U.S. PATENT DOCUMENTS

| | | | | |
|---|---|---|---|---|
| 4,064,865 A * | 12/1977 | Depew | ......................... | 126/603 |
| 4,135,493 A * | 1/1979 | Kennedy | ...................... | 126/577 |
| 4,205,659 A * | 6/1980 | Beam | ............................ | 126/578 |
| 4,245,895 A * | 1/1981 | Wildenrotter | ................. | 359/848 |
| 4,284,061 A * | 8/1981 | Wildenrotter | ................. | 126/571 |
| 4,398,802 A * | 8/1983 | Auger et al. | .................. | 359/853 |
| 4,432,343 A * | 2/1984 | Riise et al. | .................... | 126/602 |
| 4,532,916 A * | 8/1985 | Aharon | ......................... | 126/600 |
| 4,890,599 A | 1/1990 | Eiden | | |
| 5,228,924 A * | 7/1993 | Barker et al. | ................. | 136/246 |
| 5,660,644 A * | 8/1997 | Clemens | ........................ | 136/245 |
| 6,498,290 B1* | 12/2002 | Lawheed | ....................... | 136/246 |
| 6,559,371 B2* | 5/2003 | Shingleton et al. | ........... | 136/246 |
| 6,662,801 B2* | 12/2003 | Hayden et al. | ................. | 126/571 |
| 6,722,357 B2* | 4/2004 | Shingleton | .................... | 126/600 |
| 7,763,835 B2* | 7/2010 | Romeo | ....................... | 250/203.4 |

(Continued)

FOREIGN PATENT DOCUMENTS

DE           10145393 C1 *   5/2003   ................ F24J 2/52
DE     102005012054 A1 *   9/2006

(Continued)

*Primary Examiner* — Stanton L Krycinski
(74) *Attorney, Agent, or Firm* — Dickinson Wright PLLC

(57) ABSTRACT

A solar tracker and more specifically to a modular support assembly for a solar tracker that allows reduced assembly and transportation costs.

26 Claims, 9 Drawing Sheets

(56) References Cited

U.S. PATENT DOCUMENTS

| | | | |
|---|---|---|---|
| 7,878,191 B2 * | 2/2011 | Bender | 126/696 |
| 8,052,100 B2 * | 11/2011 | Zante et al. | 248/122.1 |
| 8,207,483 B2 * | 6/2012 | Gonzalez Moreno | 250/203.4 |
| 8,413,391 B2 * | 4/2013 | Seery et al. | 52/173.3 |
| 8,609,977 B2 * | 12/2013 | Jones et al. | 136/246 |
| 8,627,815 B2 * | 1/2014 | Vazquez Ingelmo et al. | 126/690 |
| 8,686,279 B2 * | 4/2014 | Almogy et al. | 136/246 |
| 2006/0044511 A1 | 3/2006 | Mackamul | |
| 2006/0090789 A1 | 5/2006 | Thompson | |
| 2008/0314440 A1 * | 12/2008 | Clemens et al. | 136/251 |
| 2009/0188488 A1 * | 7/2009 | Kraft et al. | 126/601 |
| 2009/0260619 A1 * | 10/2009 | Bailey et al. | 126/578 |
| 2010/0132769 A1 * | 6/2010 | Potter et al. | 136/251 |
| 2010/0139645 A1 * | 6/2010 | Whipple et al. | 126/576 |
| 2011/0094088 A1 * | 4/2011 | Potter et al. | 29/592.1 |

FOREIGN PATENT DOCUMENTS

| | | | | |
|---|---|---|---|---|
| DE | 102006036149 A1 * | 2/2008 | | H01L 31/042 |
| DE | 102006036150 A1 | 2/2008 | | |
| EP | 1632786 A1 | 3/2006 | | |
| KR | 100939928 B1 | 2/2010 | | |
| KR | 100972746 B1 * | 7/2010 | | |
| WO | 2008046937 A1 | 4/2008 | | |
| WO | 2009059093 A1 | 5/2009 | | |
| WO | 2010021246 A1 | 2/2010 | | |
| WO | WO 2010034851 A1 * | 4/2010 | | Y02E 10/47 |
| WO | 2010055397 A2 | 5/2010 | | |

* cited by examiner

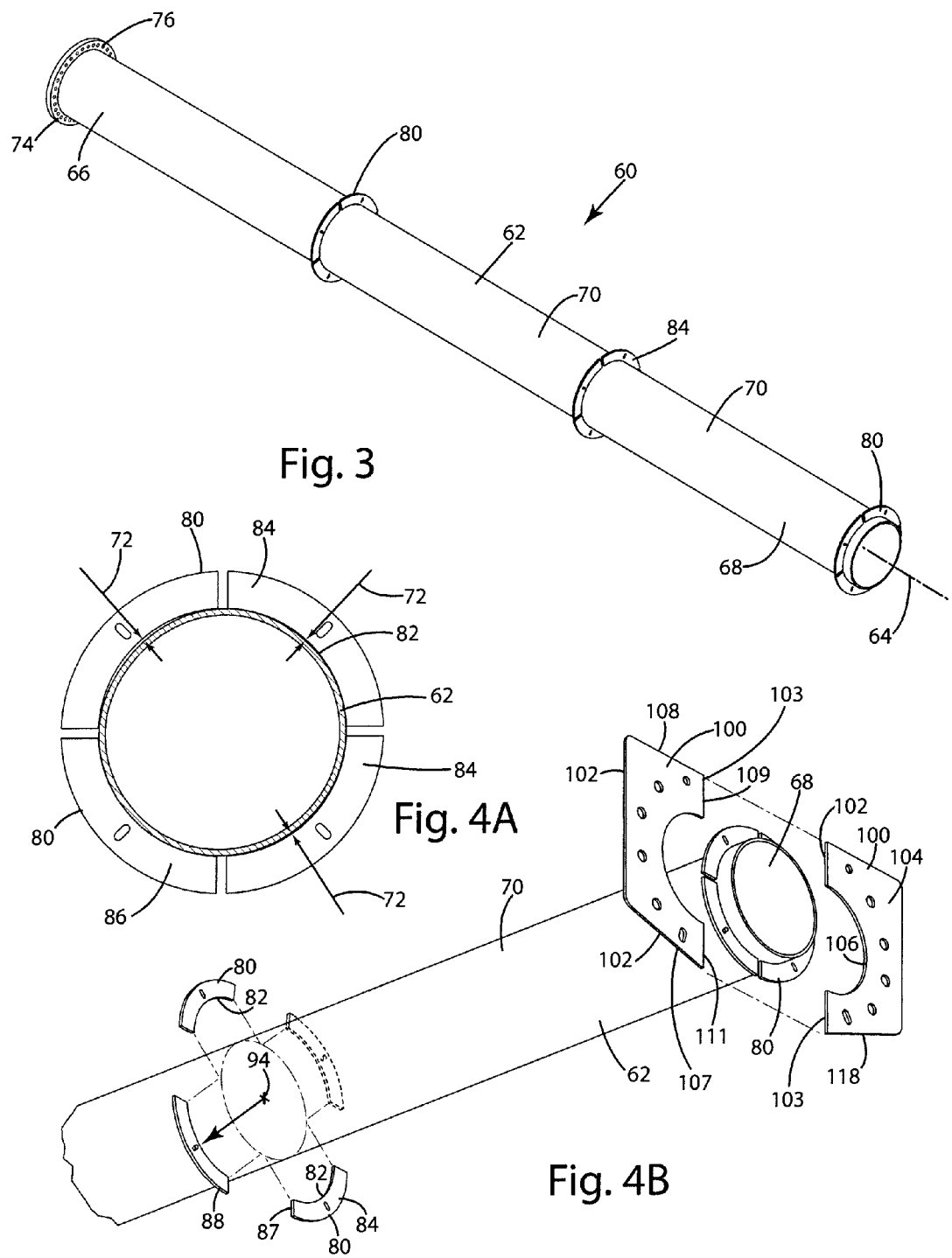

MODULAR SOLAR SUPPORT ASSEMBLY

CROSS REFERENCE TO RELATED APPLICATION

This U.S. National Stage Patent Application claims the benefit of International Application serial number PCT/US11/41771 filed Jun. 24, 2011 and U.S. provisional application Ser. No. 61/358,225 filed Jun. 24, 2010, the entire disclosures of the applications being considered part of the disclosure of this application, and hereby incorporated by reference.

BACKGROUND OF THE INVENTION

1. Field of the Invention

The present invention is generally directed to a solar tracker and more specifically to a modular support assembly for a solar tracker that allows reduced assembly and transportation costs.

2. Description of the Prior Art

Solar energy systems have a wide variety of variation depending upon the type of solar energy collected. Due to the rotation of the Earth, the tilted axis of the Earth, and the orbit path of the Earth around the sun, the position of the sun in the sky is ever changing. To maximize the amount of solar energy collected by a solar system, the solar collector, such as photovoltaic panels, reflectors, lenses and other optical devices are preferably mounted to a solar tracker which minimizes the angle of incident between the incoming light and the solar panel thereby maximizing the amount of energy produced.

Therefore, most solar energy systems use some form of a solar tracker which allows the solar collector to minimize the angle of incidents between the incoming light and the solar collectors, specifically by orienting the solar collector directly toward the position of the sun as it moves across the sky during the day, and adjusting each day to the different position of the sun in the sky caused by the tilt of the Earth's axis and its orbit relative to the sun. Therefore, the primary benefit of a tracking system is to collect solar energy for as long as possible each day and maximize accurate alignment as the sun's position shifts depending upon the season. A single axis tracker may increase the annual output of a solar collector by approximately 30% wherein a dual axis tracker which also may account for positioning of the sun due to the season may add an additional 6% of increased output. For flat panel solar collectors such as photovoltaic panels, the energy contributed by the direct beam of light from the sun drops off with the cosign of the angle between the incoming light and the panel. For concentrated photovoltaic trackers, the tracking accuracy requirements are even greater as the tracking accuracy must generally be approximately ±0.1° to deliver approximately 90% of the rated power output for high concentration systems and ±2.0° to deliver 90% of the rated power output in low concentration systems. Therefore, concentrated photovoltaic systems generally use a dual-axis solar trackers.

Misalignment of the support assembly during the manufacturing process may also cause a decrease in efficiency of the attached solar collector. More specifically, if the angles or placement of the supporting assembly and each component thereof are not precise, the efficiency of the solar panel is also reduced. This is particularly acute in concentrating photovoltaic systems where an accuracy of ±0.1° may significantly reduce the efficiency of the solar energy collected. Given the large dimensions of solar trackers, it is very difficult even under the best conditions in a manufacturing facility to obtain precise placement of the assembled parts which has also limited the ability of solar facilities to perform any on-site assembly of solar tracker support structures.

Most large scale solar array systems are typically located some distance away from population centers due to land cost or space constraints and more particularly are located significant distance away from most manufacturing facilities where solar trackers are formed. Given the remote location of most solar facilities, the transportation cost from the manufacturer's facility to the solar facility where it is installed may be significant. Currently, solar trackers are generally shipped with the complete support assemblies already assembled thereby requiring special trucks to handle the size and weight of the load, special oversized permits may be needed to transport the solar tracker from the manufacturing facility to the solar facility. Transportation costs also typically limit the ability of solar facilities to purchase from multiple manufacturing facilities as it is generally not cost-effective to ship the solar trackers over long distances. The requirement of proximity to manufacturing facilities has created a fragmented solar tracker manufacturing industry.

Therefore, there is a need for a solar tracker assembly that may be shipped cost-effectively over a long distance without the need for special oversized permits, be easily assembled, and have a high degree of accuracy when installed at the desired location.

SUMMARY OF THE INVENTION

The present invention is generally directed to a solar tracker and more specifically to a modular support assembly for a solar tracker that allows reduced assembly and transportation costs.

The solar tracker assembly for solar collectors generally includes an upper support assembly having a first longitudinal support extent and a second longitudinal support extent and wherein each of the first and second longitudinal support extents includes a tube assembly and a rib assembly which in turn support a solar collector. The tube assembly generally includes a tube with a longitudinal axis and an outer circumferential surface and wherein the tube includes a drive end and an opposing outer end. At least two slip plates are welded to the outer circumferential surface of the tube and a drive adapter plate welded to the drive end. At least two mounting plates are welded to the slip plates and each of the mounting plates includes a plurality of mounting plate bolt holes with at least two different sizes of bolt holes. The rib assembly includes a plurality of rib sections extending laterally outwardly from the tube, and each of the rib sections includes an inner rib section and an outer rib section. The inner rib section includes a plurality of rib bolt holes with which the inner rib section is coupled to the mounting plate.

The slip plates each include an arcuate inner edge and an outer edge and a slip surface that extends between the arcuate inner edge and the outer edge. The slip plates are welded to the tube assembly and are configured such that the slip surface of each of the slip plates is substantially aligned form a single slip plane surface. The tube outer circumferential surface includes deviations from an expected outer circumferential surface and each of the arcuate inner edges of the slip plates substantially matches the expected outer circumferential surface.

The arcuate inner edge of the slip plates form approximately a 360 degree circle with minor gaps between two adjacent slip plates and wherein each of the slip plates has a radial point for the arcuate edges and when the slip plates are welded to the tube, each of the radial points are substantially aligned.

The mounting plate includes at least one four directional location hole, at least one two direction location hole, and a plurality of oversized holes. Of course, the holes on the mounting plate may instead be placed on the rib sections. Each mounting plate includes a linear edge and the linear edges are substantially aligned when the mounting plates are welded to the slip plates around the tube. The mounting plates further include a second edge, opposite the linear edge and the second edge is angled relative to the linear edge and not parallel to the linear edge. The two directional hole is a slot having a width and a length, and wherein the width is smaller than the length and the width is substantially equal to a diameter of the four directional location. The oversized holes all have a diameter that is greater than the width and smaller than the length. The linear edge and the second opposing edge have an inner surface extending therebetween and the inner edge includes a first and second inner portion and an arcuate portion between the first and second inner portions, and the arcuate portion has a radius that is greater than the radius of the inner arcuate edge on the slip plate.

Each of the rib sections includes and inner and outer section and the inner rib section includes an inner rib surface having an arcuate cutout portion. The arcuate cutout portion is configured to engage the inner rib surface of an opposing rib as well as the tube when rib sections are placed in an opposing alignment.

Each of the outer rib sections and the inner rib sections includes a center portion extending between an upper support surface and a lower support surface and wherein the upper support surface on each of the outer and inner rib sections is substantially aligned. The lower support surface on each of the outer and inner rib sections is also substantially aligned and the upper support surface and the lower support surface are angled relative to each other and are not aligned and are not parallel. The lower support surface approaches the upper support surface, and the upper support surface is offset from the longitudinal axis and extends perpendicularly away from the longitudinal axis relative to two axes.

Each outer rib section and the inner rib section is formed from two halves, each having a C shape. Each half is welded in an opposing relationship to create an I shape, and one of the two halves forming each section has a greater length. The disparity in length cause each of the outer and inner rib sections include an opposing mounting surface formed by the extension of one half past the other half and the mounting surfaces of the outer and inner rib sections are welded together, to form each complete rib section.

A plurality of stringers extend substantially parallel to the tube and substantially perpendicular to the rib assemblies and wherein the plurality of stringers are coupled to an upper support surface on each of the rib assemblies.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a perspective view of the tube including slip rings;

FIG. 4A is a sectional view of the tube including slip rings with arrows identifying areas not meeting tolerances;

FIG. 4B is an exploded perspective view of the slip rings and mounting plate;

DETAILED DESCRIPTION OF THE ENABLING EMBODIMENTS

Figure 1:
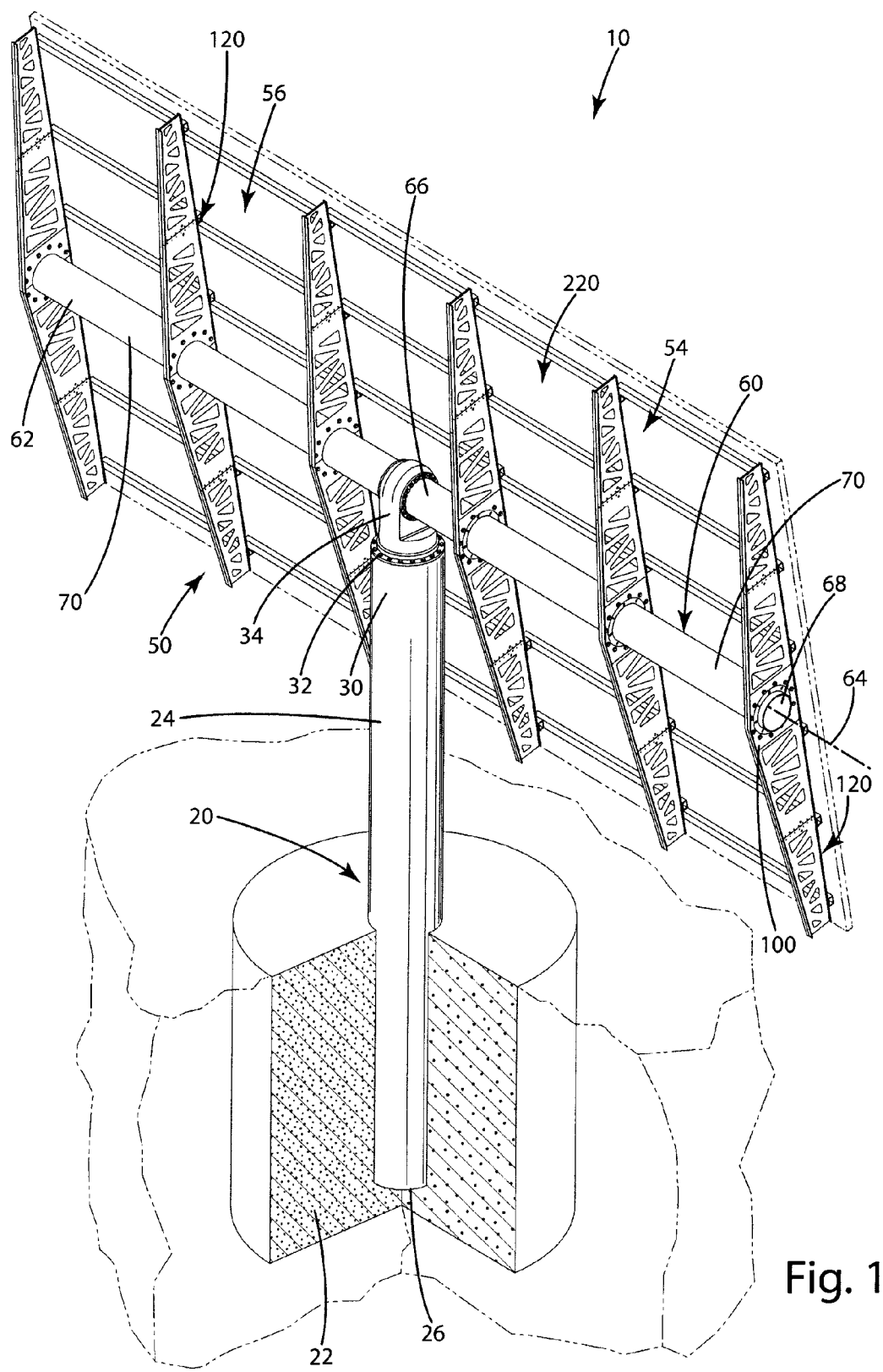
FIG. 1 is a rear perspective view of the solar tracker including foundation.
Figure 2:
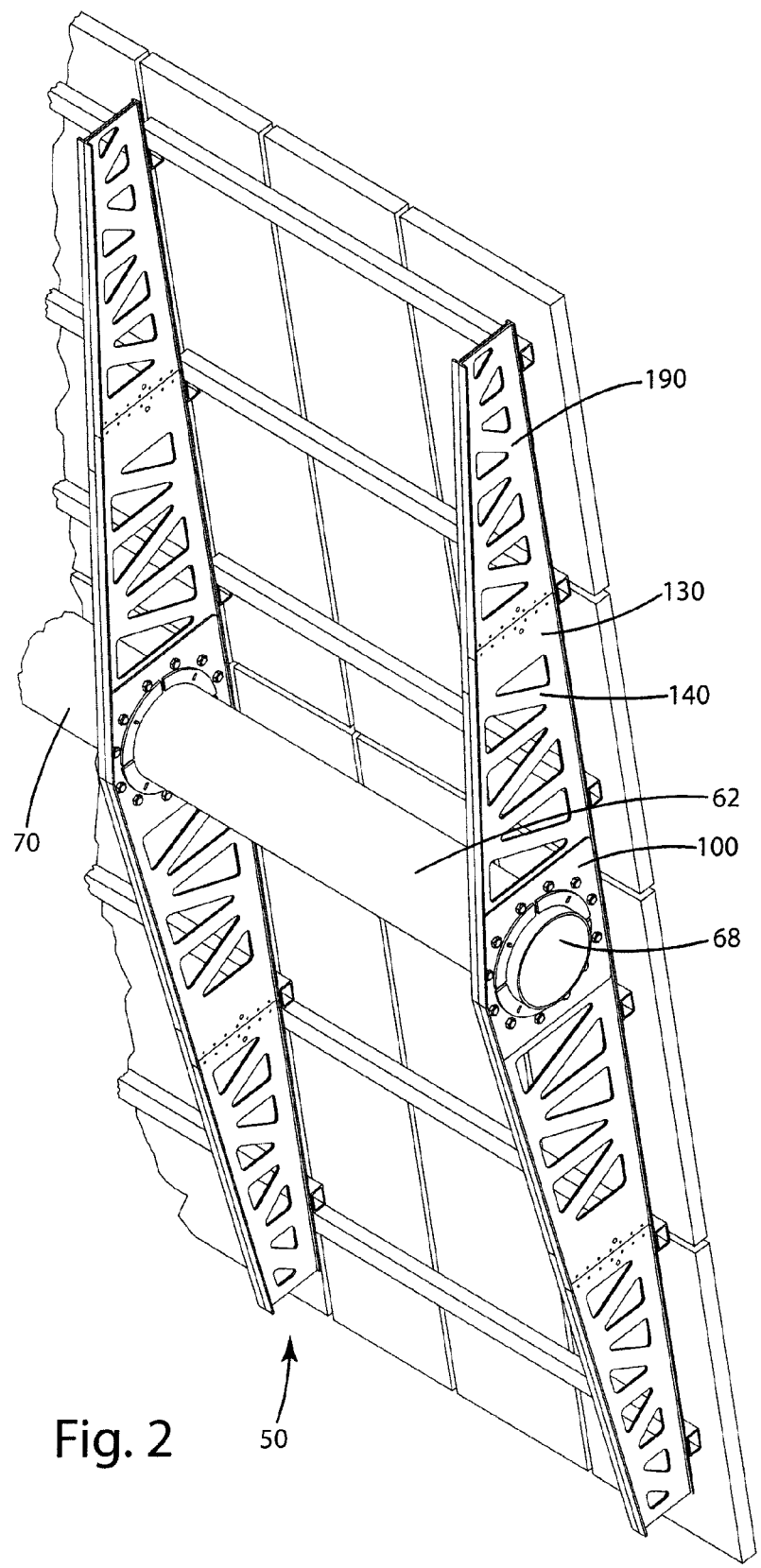
FIG. 2 is an enlarged partial rear perspective view of the solar tracker.

Referring to the Figures, wherein like numerals indicate corresponding parts throughout the several views, As illustrated in FIG. 1, the present invention is generally directed to a solar tracker assembly 10. The solar tracker assembly 10 generally includes a support assembly base 20 and a support assembly upper 50 which in turn supports a collector assembly 240 illustrated in phantom in FIG. 1. As discussed in greater detail below, the solar tracker assembly 10 is generally configured to allow for easy manufacturing, transportation, and then accurate assembly at remote locations while maintaining desired tolerances to maximize the efficiency of any collector assembly 240.

The support assembly base 20 may be formed in a variety of configurations and may be any type of structure that provides sufficient support for the support assembly upper 50. As illustrated in FIG. 1, the support assembly base 20 generally includes a foundation 22, illustrated as concrete in the ground, from which a mast 24 extends vertically therefrom. The foundation 22 and mast 24 may be any type of structures capable of carrying the weight and any associated stresses such as wind stress. The mast 24 generally has a first end 26 secured within the foundation 22 and a second end 30 vertically disposed therefrom. While the mast 24 is illustrated as an elongated tube, it may be formed in any shape, size, or configuration that provides sufficient support. Coupled to the second end 30 is a welded drive support plate 32 as illustrated in FIG. 1. Of course, any other mechanism for coupling the drive unit 34 may be used in place of the drive support plate 32 and the drive support plate 32 may vary depending upon the type of drive unit 34 selected.

The drive unit 34 is disposed between the support assembly base 20 and the support assembly upper 50. The drive unit 34 is specifically configured to allow the collector assembly 240 to track the sun as it moves across the sky. Therefore, the drive unit 34 is capable of rotation along at least one axis. The drive unit illustrated in FIG. 1 is further capable of rotation about two axes therefore not only allowing rotation around a longitudinal axis of the mast 24 but also around a longitudinal axis 64 of a tube 62 as described below. A two-axis drive unit 34 allows the collector assembly to not only to track the sun throughout the day but also allows for adjustment between each day to account for variations in position of the sun each day.

Figure 8:
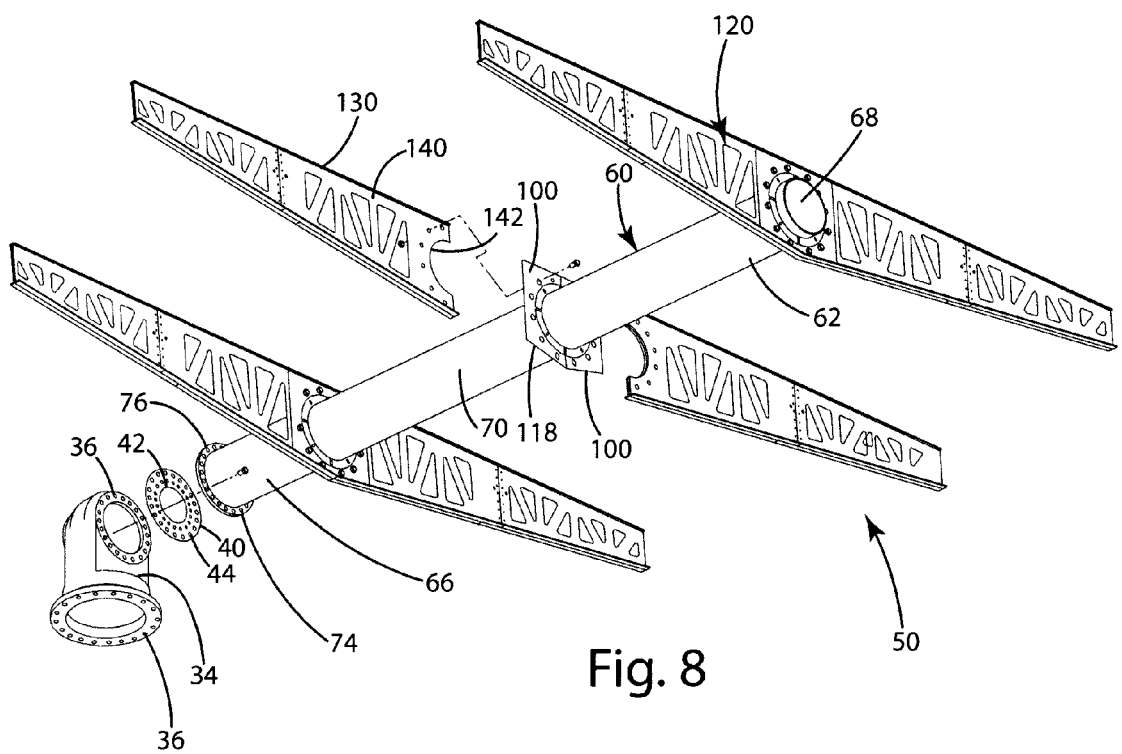
FIG. 8 is a partial exploded perspective view of a support assembly ring about the solar panels.
Figure 9:
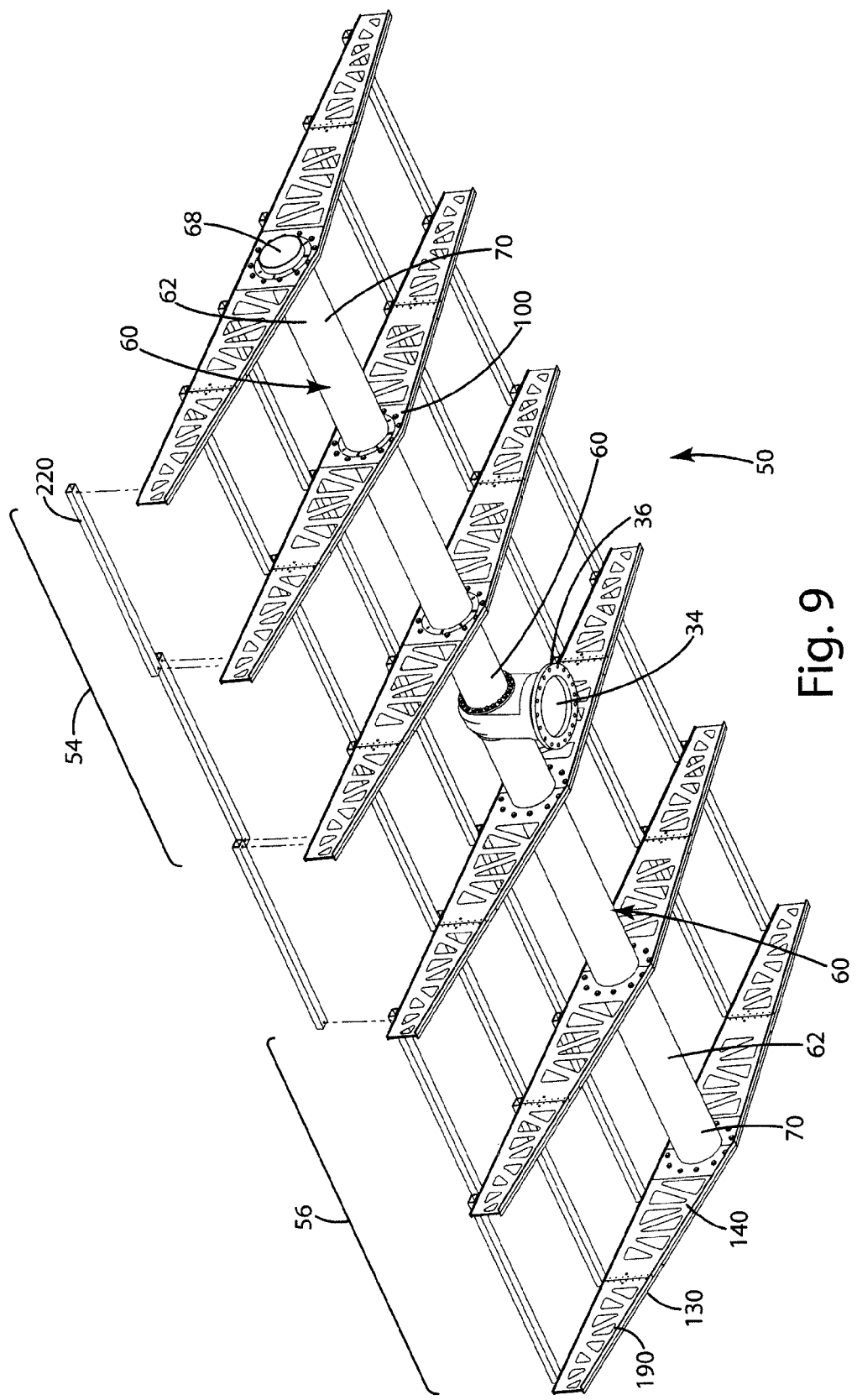
FIG. 9 is a bottom perspective view of a complete support assembly including stringers being attached to the ribs.

Turning to FIGS. 1 and 9, the drive unit 34 generally includes bolt holes 36. The drive unit 34 is generally illustrated as being bolted to both the tube 62 and mast 24. As best illustrated in FIG. 8, a drive adapter plate 40 may be disposed between the tube 62 and the drive unit 34. The drive adapter plate 40 generally includes a plurality of inner holes 42 and outer holes 44. The drive adapter plate 40 allows for easy bolting of the support assembly upper 50 specifically the tube 62 to the drive unit 34 and for easy modular manufacturing and assembly. More specifically, the drive adapter plate 40 acts as an interface between the tube 64 and drive unit 34 and therefore, the tube 62 may be manufactured to a set of standard specifications while the drive adapter plate 40 allows the standardized tube 62 to be coupled to a variety of different drive units 34 having different bolt patterns, diameter of bolt patterns, as well as size of bolts with only the use of a different drive adapter plate 40. During the assembly process, it is expected that the drive adapter plate 40 is first coupled to the drive unit 34 and then the tube 62 is coupled thereto.

The support assembly upper 50 generally includes a first support extent 54 extending to one side of the drive unit 34 and a second support extent 56 extending on the opposing side of the drive unit 34. Each support extent 54, 56 generally includes a tube assembly 60 and a rib assembly 120.

The tube assembly 60 is best illustrated in FIG. 3 and generally includes a tube 62 having a longitudinal axis 64, a drive end 66, an outer end 68, and an outer circumferential surface 70. The tube 62 may be any tube, size and shape, and capable of handling the required weight and stress loads. In the past, the tubes or other longitudinal support members to which the rib assembly 120 attached were highly specialized having very specific tolerances. The high tolerance of these prior tubes was required to minimize even small deviations in the desired positioning of the collector assembly 240. The present invention is unique in that it uses readily available and lower cost tubes with only minimal requirements regarding tolerances of the size and shape tubes 62. This allows the use of more common tubes, that are capable of carrying the desired weight loads such as sewer pipes, light poles, or other structures that do not meet the tolerance specs for supports used in solar trackers required. The longitudinal axis 64 of the tube 62 is generally the axis about which the tube 62 rotates from the drive unit 34. As discussed above, the drive end 66 is generally coupled to the drive unit 34 while the outer end is typically plugged with an end cap that is not illustrated. As illustrated in FIG. 4A, the present invention uses tube 62 which may include deviations 72 from a perfectly circular outer circumferential surface 70.

The tube assembly 60 may include a drive plate 74 including bolt holes 76 which is welded to the drive end 66 of the tube 62. Of course, the drive plate 74 may be formed in any desired size, shape, or configuration so long as it sufficiently couples the tube 62 to the desired drive unit 34. Although the drive plate 74, as illustrated in FIG. 3, is welded to the end of the tube, in some embodiments it may be desirable to use slip plates 80, discussed in greater detail below, to weld the drive plate 74 directly into the tube 64.

To adjust for the above described deviations 72 from the outer circumferential surface 70, the present invention uses at least two slip plates 80 to create a known planar surface 84 specifically called the slip plane as well as correct the roundness of the outer circumferential surface 70. The present invention requires at least two slip plates 80, however, any number of plurality of slip plates 80 may be used. It is expected that three or four slip plates 80 will provide the optimal ease of assembly while yet allowing for easy correction of any deviations 72 to the outer circumferential surface 70. More specifically, a tube 62 may have a substantially elliptical shape in certain sections that would make it difficult to attach only two slip plates around the circumferential surface. It is expected that three or four slip plates will allow sufficient adjustment for most deviations 72 while yet allowing for ease of assembly by requiring less parts to be held in position in a jig and in the proper location on the tube while being welded to the tube 62.

Each slip plate 80 generally includes an arcuate inner edge 82 that substantially approximates the outer circumferential surface 72 of the tube 62, specifically the expected outer circumferential surface. However, it is also expected that the arcuate inner edge 82 will have a radius 94 that is greater than the expected outer circumferential surface 72 to allow for the above described deviations 72. More specifically, it is desirable for the slip plates 80 with their arcuate inner edges to form almost a complete circle around the outer circumferential surface 70. The larger radius of the arcuate edges 82 allows the slip plates 80 to be spaced slightly from the tube 62. This space is then filled by a weld thereby attaching the slip plates 80 to the tube 62. Each of the slip plates 80 also generally include a planar slip surface that when combined with the other slip plates 80 forms an overall slip plane 84. The creation of the slip plane 84 allows for easy attachment of a mounting plate 100 as described below. The slip plates 80 further include an outer edge 88 and adjoining edges 87. Although not illustrated in some embodiments, the adjoining edges 87 may also be welded together such that the slip plates 80 are coupled to one another as well as to the tube 62. It should be readily recognized that any weld of the adjoining edges 87 or to the tube 62 must not interfere or protrude through the slip plane 86. The outer edge 88 may have any desired shape or configuration.

At least two mounting plates 100 are attached to each side of the tube 62 and are specifically directly welded to the slip plates 80. The use of the mounting plate 100 being welded to the slip plate 80 allows for the above described deviations 72 in the tube while yet maintaining tolerances of as low as ±0.1° on the collector assembly once the rib assembly 120 is attached thereto. While more than two mounting plates 100 could be used, it is expected that a single mounting plate will mount a single rib section 130 and therefore since the present invention illustrates the upper support assembly as having a rib assembly 120 with rib sections 130 extending on both sides of the tubes 62, it will use two mounting plates 100. In an embodiment where a rib assembly 120 extends only on one side of the tube 62, the present invention would only need a single mounting plate, to attach the individual rib sections 130.

Figure 10:
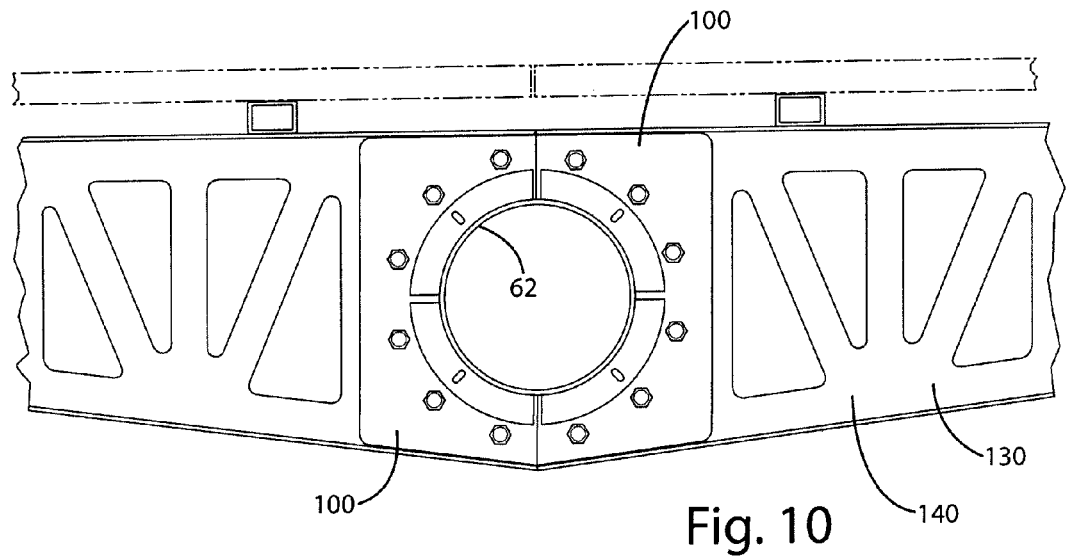
FIG. 10 is a partial end view of the support assembly.

The mounting plate 100 is generally configured to have an outer circumference 102 having an inner surface 103 with a first inner edge 109 and a second inner edge 111. Disposed between the first inner edge 109 and the second inner edge 111 is an arcuate cut-out 106 to allow the mounting plate 100 to substantially surround a portion of the tube 62. The arcuate cut-out 106 also allows the mounting plate to have reduced mass and to be easily welded to the slip plates 80, and also minimize the size of the slip plates 80. The outer circumference 102 also includes a linear edge 108 and an opposing edge 107. While the opposing edge 107 could be parallel to the linear edge 108, the present invention, to save weight, provides for rib assemblies that have reducing height as they extend outwardly from the tube 62. Therefore, the rib assemblies 120 are maximized for a balance of weight and support at any given point. Therefore, the present invention, as illustrated in FIG. 4B as well as FIGS. 10 and 11, has the opposing edge 107 angling toward the linear edge 108 as it extends outwardly from the tube 62 specifically such that the linear edge 108 is not parallel to the opposing edge 107.

Figure 11:
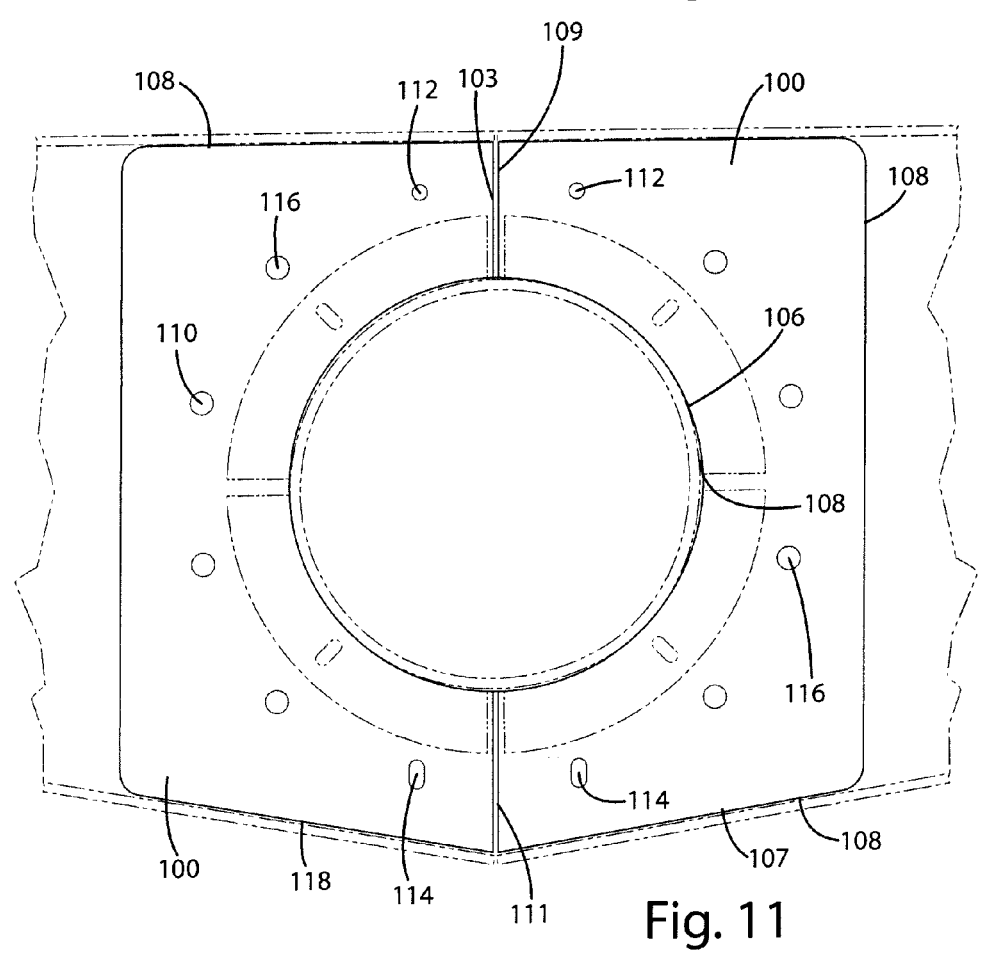
FIG. 11 is an end view of a mounting plate and support assembly showing mounting holes.
Figure 12:
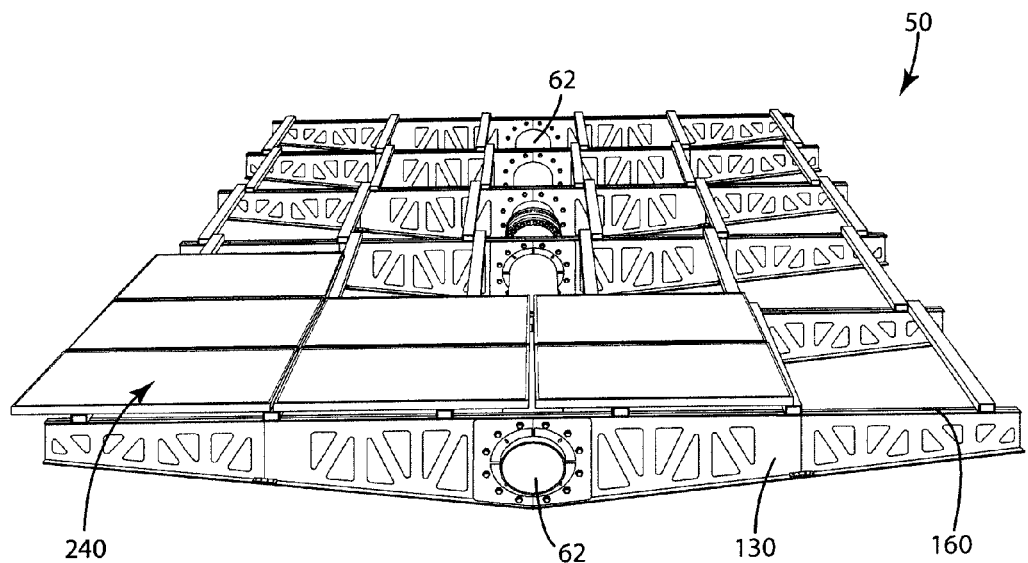
FIG. 12 is a top perspective view of the support assembly illustrating attachment of solar collector.

The mounting plate 100 is, as discussed above, welded directly to the slip plates 80; however, the mounting plate 100 to allow for easier assembly on site is coupled to the rib assemblies through the use of bolt holes 110. Therefore, to allow for easy shipping, the tube assembly 60 may be shipped separately from the various rib sections 130, forming the rib assembly 120, and the rib sections 130 are bolted to the tube 62 at the desired end location of the solar facility. To allow for variations and tolerances while yet providing the desired tolerance accuracies, the mounting plate 100 uses unique bolt hole 110 configurations. More specifically, the mounting plate 100 includes one four-directional locating bolt hole 112 having four directional location when used with a properly sized shoulder bolt (not illustrated) such that it is specifically sized to be directly engaged in all directions to the shoulder bolt that is inserted therein during the assembly process. The four-directional location bolt hole 112 is best illustrated in FIG. 11. To ensure that the rib assemblies 120 specifically the rib sections 130 extending from a specific mounting plate 100 are in the desired tolerance spec, an opposing two-directional bolt hole 114 provides a two-directional location when used with a properly sized shoulder bolt as specifically illustrated in FIG. 11. The remaining bolt holes 110 are over-sized bolt holes 116 and allow for variations between the mounting plate and rib assemblies while yet having the desired tolerance arrangements.

Figure 6A:
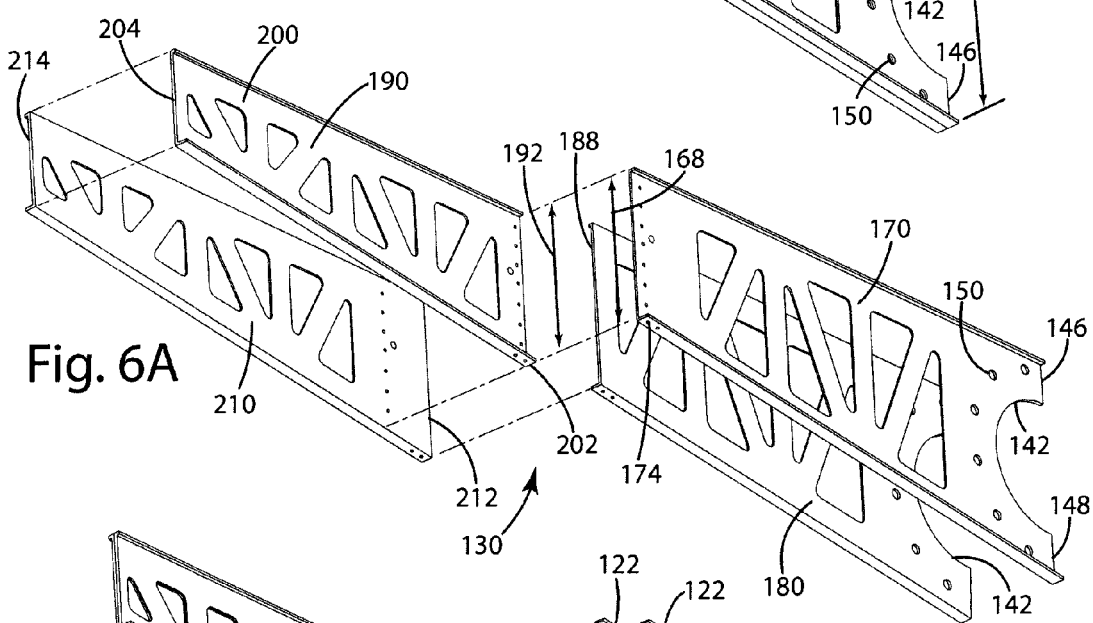
FIG. 6A is an exploded perspective view of a rib assembly.

As described above and illustrated in the Figures, the present invention includes rib assemblies 120 which extend outwardly from the tube 62 to support the collector assembly 240. The rib assemblies 120 are generally formed from rib sections 130, specifically an inner section 140 and an outer section 190. While the present invention is only illustrated using an inner section 140 and outer section 190, in some embodiments it may also be desirable to use intermediate sections, not illustrated, to further extend the length of the rib assembly 120 away from the tube 62 thereby allowing a larger collector assembly. The rib assemblies 120 are also configured to allow easy modular assembly either at the manufacturing plant or in the field as well as easy transportation to and final assembly at the solar facility. As illustrated in the Figures, specifically FIG. 6A, the inner section 140 generally includes an arcuate inner cut-out portion 142 which surrounds the tube 62. It should be noted that the inner edge height 144 is larger than the outer edge height 168 thereby allowing for reducing weight as the inner section 140 extends outwardly away from the tube 62. The rib sections 130 generally include a center portion 154, and an upper support surface 160 disposed on one edge of the center portion and a lower support surface 164 disposed opposite of the upper support surface 160. As illustrated in the Figures, the rib assemblies 120 and specifically the inner section 140 and outer section 190 generally are shaped in the form of an I-beam. The upper support surface 160 is generally a planar surface 162 extending across the intersection 140 and outer section 190. The lower support surface 164 is generally angled relative to the upper support surface 160 and as such is not aligned with or parallel to the upper support surface.

Figure 5:
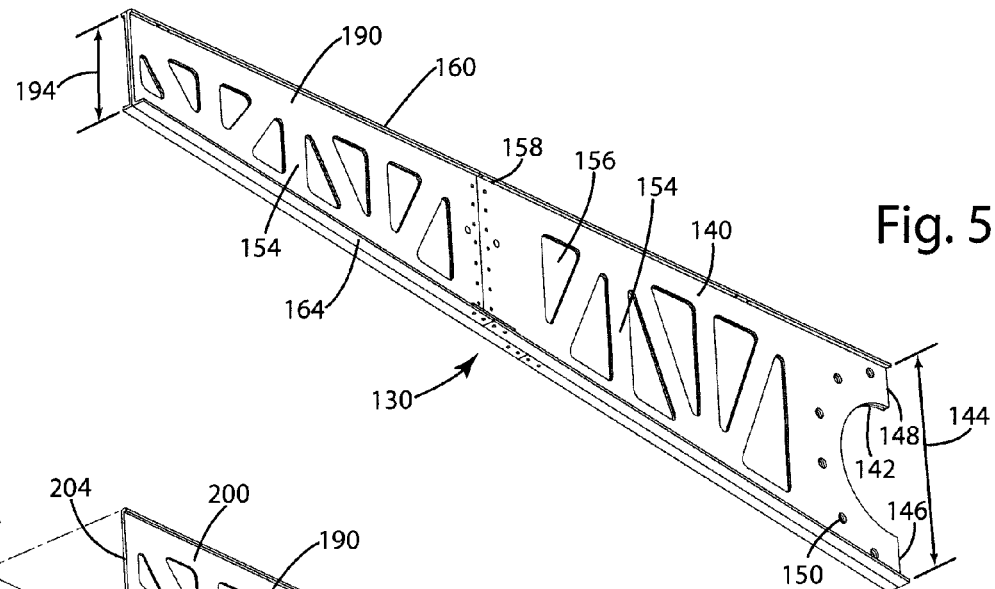
FIG. 5 is a perspective view of a single rib.
Figure 6B:
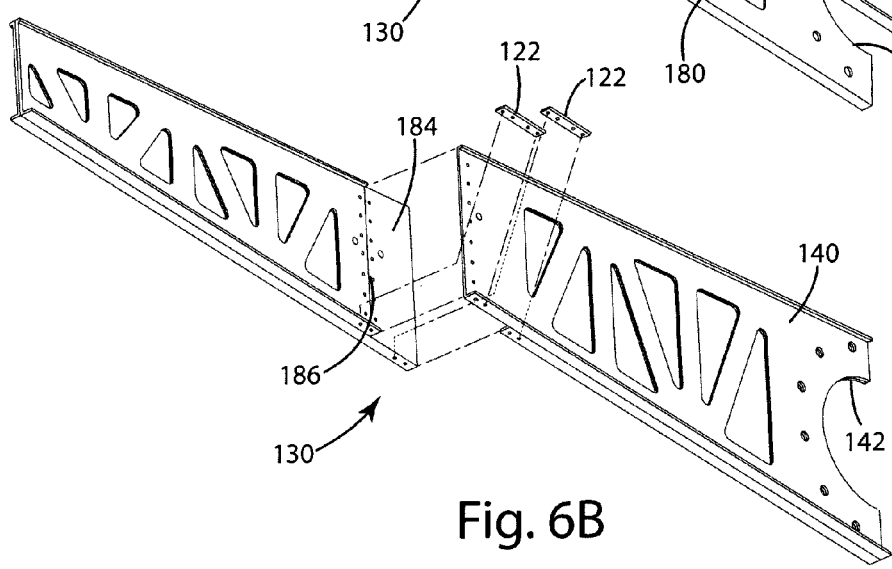
FIG. 6B is a perspective view showing the assembly of a first and second rib into a rib assembly.
Figure 7:
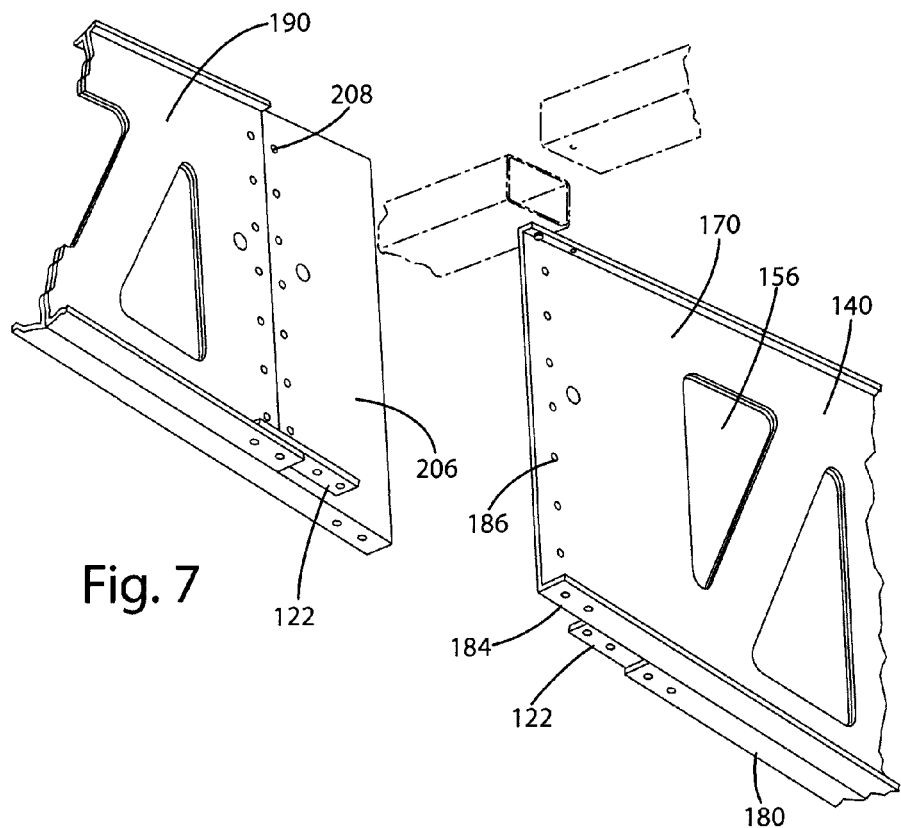
FIG. 7 is a partial bottom perspective view of a rib assembly.

Each of the inner sections and outer sections form the I-shape by the combination of two C-shaped beams being coupled together back-to-back. More specifically, the inner section 140 includes a first inner section half 170 having a first inner section length 172, a first inner section outer edge 174 as well as a second inner section half having a second inner section length as well as a second outer section edge 188. It should be noted that the first inner section length 172 is varied from the second outer section length such that the first inner section outer edge 174 and second inner section outer edge 188 are offset to each other to create a rib mounting surface 184 on one of the first and second inner section halves 170, 180. The mounting surface 184 also includes weld surfaces 186. The outer section 190 is formed generally similar to the inner section 140 but has the inward portions offset to form a second mounting surface 206 with its own weld areas 208 that mates with the first mounting surface 184. Therefore, the complimentary overlap allows for a unitary member wherein the edges 174, 178 of the inner section 140 directly oppose edges 202 and 212. The inner section 140 is generally illustrated as being welded to the outer section 190 along the mounting surfaces 184, 206; however, in some embodiments these could be bolted together for later assembly in the field. The outer edges 204, 214 are generally aligned as illustrated in FIGS. 5 and 6B. For purposes of illustration, the outer section 190 specifically includes an outer section inward height 192 which is larger than the outer section outward height 194. The outer section 190 is also generally formed from a first outer section half 200 which is mated to a second outer section half 210. The mounting surface 206 on the outer section 190 and mounting surface 184 in the inner section 140 may be varied in size, shape and configurations but generally are mirror images of each other to match up and completely overlap with each other. The first outer section inner edge 202 generally mates to the first inner section outer edge 174 while the second outer section inner edge 212 generally mates to the second outer edge 188. In some embodiments, these edges could be welded together for further support. As illustrated in FIG. 5, an additional formation such as the illustrated supports 158 may be added to provide further support and stress resistance. The rib assemblies are also generally formed defining a variety of cut-outs 156 to save weight over having solid rib sections.

As further illustrated in FIG. 9, the upper support assembly 50 may include a plurality of stringers 220 and while the stringers 220 are illustrated as being offset from one another in sectional lengths extending longitudinally from one rib section 130 to the nearest proximate rib section 130, they could also be configured to extend across multiple rib sections 130. The stringers 220 are generally formed in the shape of a box frame that is hollow and are coupled directly to the rib assembly 120 with various types of fastening hardware or could be welded directly to the upper support surface 160.

Figure 14:
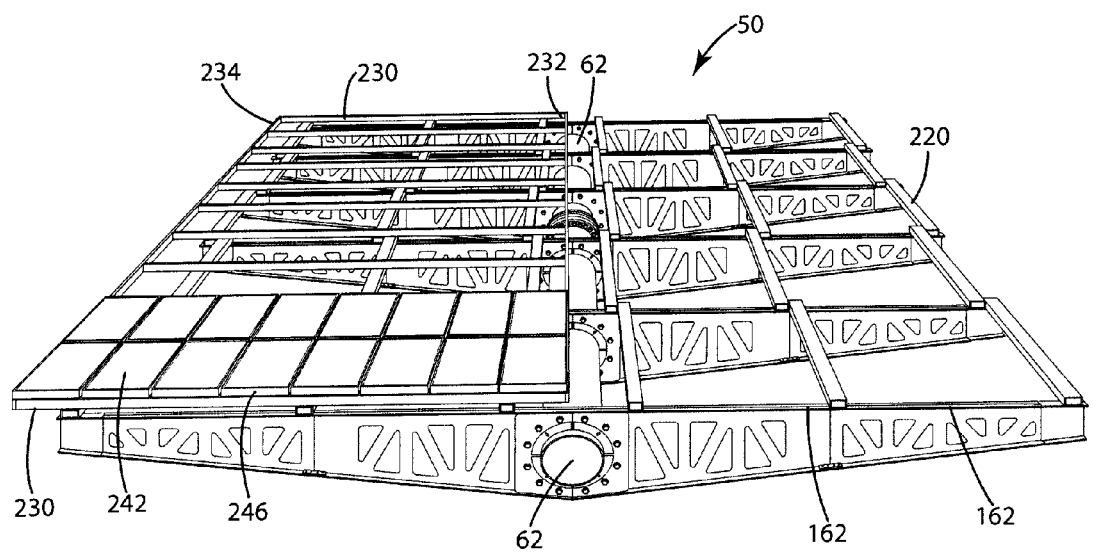
FIG. 14 is alternative top perspective view of the support assembly including attached solar collector.
Figure 15:
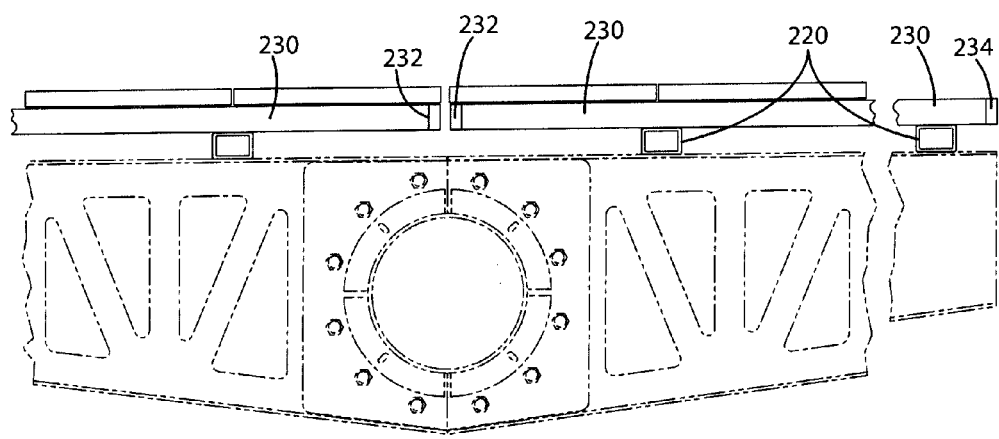
FIG. 15 is a partial end view of the support assembly in FIG. 14.

As further illustrated in FIGS. 14 and 15, additional lateral support beams 230 may be added above the stringers 220. These additional lateral support beams 230 are generally configured to run adjacent to and parallel to a rib section 130. They may also be configured to have additional lateral support beams 230 in-between each rich section 130 also coupled on top of the stringers 220. These additional lateral support beams 230 provide additional support to stresses such as wind stress while also improving modular assembly and may allow different configurations of the collector assembly 240 and easy assembly of the collector assembly 240 thereto. As further illustrated in FIGS. 14 and 15, an additional longitudinal inner support beam 232 as well as an additional longitudinal outer support beam 234 may be added thereto and coupled or welded to the ends of the additional lateral support beams 230.

Figure 13:
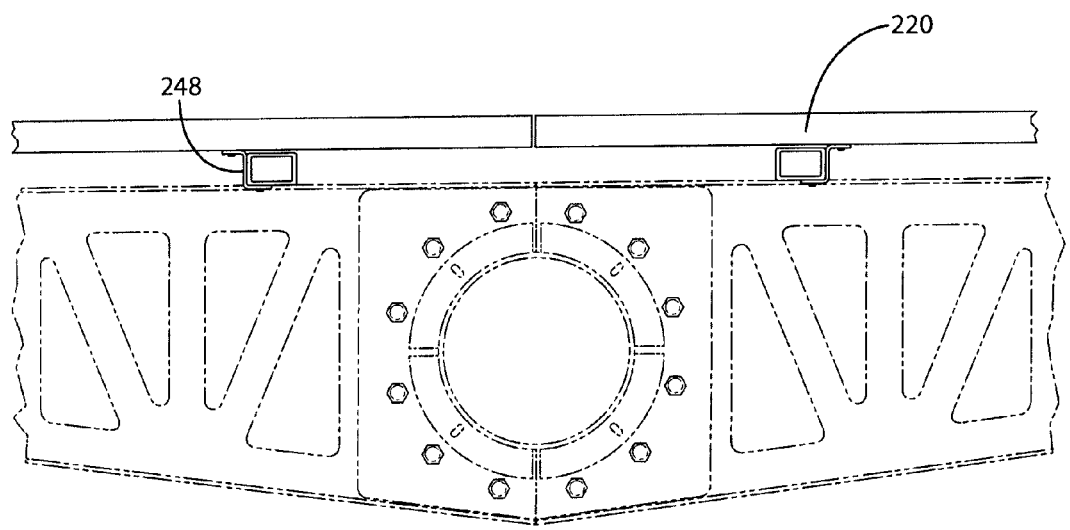
FIG. 13 is a partial end view of the solar collector being attached to the stringers.

The collector assembly 240 may be a variety of solar collectors assembled to the upper support assembly 50. As illustrated in FIG. 14, the collector assembly may be formed from a variety of solar panels 242 which are surrounded by their own frames 246. FIG. 13 further illustrates a mounting assembly 248 for mounting a collector assembly 240 to the upper support assembly 50.

The formation of the upper support assembly 50 is generally formed in two portions specifically that of the tube assembly 60 and the rib assemblies 120. In forming the tube assembly 60, a desired tube 62 is acquired or formed and the drive plate 74 is attached thereto. By first attaching the drive plate 74 to the tube through welding, the rest of the assembly of the tube may be indexed to the drive plate 74. Next, the slip plates 80 are assembled into a jig and placed around the tube to form a circular inner and a slip plane 84. The slip plates 80 are then welded to the tubes thereby eliminating any deviations from circular outer 72 as illustrated in FIG. 4A. As further illustrated in FIG. 4B, after the slip plates 80 are welded to the tube 62, the mounting plates 100 are placed in a jig and further welded to the slip plates 80. Of course, the mounting plates 100 in some embodiments may be bolted to the slip plates 80. With the tube assembly 60 completed with the drive plate 74, and slip plates 80 both welded to the tube and then the mounting plate 100 welded to the slip plates 80, the tube assembly 60 may be prepared for shipment.

The rib assemblies 120 may be formed before, after or concurrently with the tube assembly 62. First, the inner section halves 170, 180 as well as the outer section halves 200, 210 are formed to the desired specifications for the particular embodiment and include the unique characteristics described above. Next, the inner section halves 170, 180 as well as the outer section halves 200, 210 are welded together to form a complete inner section 140 and outer section 190 each in the shape of an I-beam. Depending upon the desired configuration, the inner section 140 and outer section 190 may be prepared for shipment to the end location where it would be further assembled at the site at the solar facility or the manufacturing facility can further assembly the inner section 140 and outer section 190 into a single rib section 130. With each rib section 130 being assembled or configured to be assembled on site, these are shipped to the site of the solar facility for further assembly to the tube assembly 60. The stringers 220 are also formed and prepared for shipment and, if required, the additional lateral support beams 230 as well as the additional longitudinal inner and outer support beams 232, 234 would be prepared and shipped.

Once at the site of the solar facility, the rib sections 130 if previously assembled may be attached to the tube assembly 60. If the rib sections were not already assembled at the manufacturing site, the individual inner sections 140 and outer sections 190 are attached together by welding or bolt assembly to form the rib sections 130. If necessary, a mounting strap 122 may be provided as illustrated in FIG. 6B to each side of a rib section across the joint between the inner section 140 and outer section 190. With the rib assembly 120 completely assembled to the tube assembly 60, the stringers 220 are then attached to the rib assembly 120.

The solar collector assembly 240 is then attached to the stringers 220 and then wired as needed. It is expected that the first support extent 54 and second support extent 56 will be individually formed and then attached directly to the drive unit 34 which is already attached to the mast 24 and secured by the foundation 22. Of course, the whole upper support assembly 50 including the drive assembly 54 between the first support extent 34 and second support extent 56 may be assembled at one time to the mast 24.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A solar tracker assembly for solar collectors comprising:
an upper support assembly having a first longitudinal support extent and a second longitudinal support extent and wherein each of said first and second longitudinal support extents includes:
a tube assembly having a tube with a longitudinal axis and an outer circumferential surface and wherein said tube includes a drive end and an opposing outer end and at least two slip plates welded to said outer circumferential surface and a drive adapter plate welded to the drive end;
at least two mounting plates welded to said slip plates and wherein each of said mounting plates includes a plurality of mounting plate bolt holes with at least two different sizes of bolt holes;
a rib assembly having a plurality of rib sections extending laterally outwardly from said tube; and
wherein each of said rib sections includes an inner rib section and an outer rib section and wherein said inner rib section includes a plurality of rib bolt holes and wherein said inner rib section is coupled to a respective one of said at least two mounting plates.

2. The solar tracker assembly of claim 1 wherein said at least two slip plates each include an arcuate inner edge and an outer edge and wherein a slip surface extends between said arcuate inner edge and said outer edge.

3. The solar tracker assembly of claim 1 wherein each of said at least two slip plates welded to said tube assembly are configured such that a slip surface of each of said at least two slip plates are substantially aligned to form a single slip plane surface.

4. The solar tracker assembly of claim 2 wherein said outer circumferential surface of said tube includes deviations from an expected outer circumferential surface and wherein each of said arcuate inner edge of said at least two slip plates substantially matches said expected outer circumferential surface.

5. The solar tracker assembly of claim 4 wherein said arcuate inner edge of said at least two slip plates form approximately a 360 degree circle with gaps between two adjacent slip plates and wherein each of said slip plates has a radial point for said arcuate edges and wherein when said at least two slip plates are welded to said tube, each of said radial points are substantially aligned.

6. The solar tracker assembly of claim 1 wherein said at least two mounting plates each include at least one four directional location hole, at least one two direction location hole, and a plurality of over-sized holes.

7. The solar tracker assembly of claim 1 wherein said inner rib section includes, at least one four directional location hole and at least one two direction location hole, and a plurality of over-sized holes.

8. The solar tracker assembly of claim 6 wherein each of said at least two mounting plates includes a linear edge and wherein said linear edges are substantially aligned when said at least two mounting plates are respectively welded to said at least two slip plates.

9. The solar tracker assembly of claim 8 wherein each of said at least two mounting plates includes a second edge, opposite said linear edge and wherein said second edge is angled relative to said linear edge and not parallel to said linear edge.

10. The solar tracker assembly of claim 6 wherein said two directional hole is a slot having a width and a length, and wherein said width is smaller than said length and said width is substantially equal to a diameter of said at least one four directional location hole and wherein said over-sized holes all have a diameter that is greater than said width and smaller than said length.

11. The solar tracker assembly of claim 1 wherein each of said mounting plates includes a linear edge and a second opposing edge and an inner surface extending therebetween and wherein said inner edge includes a first and second inner portion and an arcuate portion between said first and second inner portions, and wherein said arcuate portion has a radius that is greater than a radius of the inner arcuate edge on said slip plate.

12. The solar tracker assembly of claim 11 wherein said first and second inner surfaces are substantially aligned.

13. The solar tracker assembly of claim 1 further including a drive unit capable of rotation about at least one axis and said drive adapter plate is coupled to said drive unit and wherein said drive adapter plate includes a plurality of inner bolt holes and a plurality of outer bolt holes each arranged circumferentially about a single radius point.

14. The solar tracker assembly of claim 1 wherein said inner rib section includes an inner rib surface having an arcuate cutout portion.

15. The solar tracker assembly of claim 14 wherein said inner rib surface of one of said inner rib sections is configured to engage said inner rib surface of an opposing inner rib section, and wherein each of said plurality of rib sections is disposed in an opposing relationship to another of said rib sections with said tube therebetween.

16. The solar tracker assembly of claim 1 wherein each of said outer rib section and said inner rib section includes a center portion extending between an upper support surface and a lower support surface and wherein said upper support surface on each of said outer and inner rib sections is substantially aligned and wherein each of said lower support surface on each of said outer and inner rib sections is substantially aligned and wherein said upper support surface and said lower support surface are angled relative to each other and are not aligned.

17. The solar tracker assembly of claim 16 wherein said lower support surface approaches said upper support surface, and said upper support surface is offset from said longitudinal axis and extends perpendicularly away from said longitudinal axis relative to two axes.

18. The solar tracker assembly of claim 1 wherein each of said outer rib section and said inner rib section is formed from two halves, each having a C shape and wherein each half is welded in an opposing relationship to create an I shape, and wherein one of said halves welded to the other half has a greater length.

19. The solar tracker assembly of claim 1 wherein each of said inner rib section and outer rib section includes a first half having a first length and a second half having a second length and wherein said first length is greater than said second length.

20. The solar tracker assembly of claim 19 wherein an inner rib surface on said inner rib section is formed by each half.

21. The solar tracker assembly of claim 19 wherein an outermost portion of an outer edge on said halves of said inner rib section is only formed by one of said halves.

22. The solar tracker assembly of claim 19 wherein each of said outer and inner rib sections include a mounting surface formed by an extension of one half past the other half and wherein said mounting surfaces of said outer and inner rib sections are welded together.

23. The solar tracker assembly of claim 19 wherein the shorter of each first and second half on each of said inner rib section and said outer rib section abuts the longer of each first and second half on each of said inner rib section and said outer rib section.

24. The solar tracker assembly of claim 1 further including a plurality of stringers extending substantially parallel to said tube and substantially perpendicular to said rib assemblies and wherein said plurality of stringers are coupled to an upper support surface on each of said rib assemblies.

25. The solar tracker assembly of claim 24 further including a plurality of secondary support beams extending perpendicular to said stringers and substantially parallel to each rib assembly and wherein said plurality of secondary support beams includes individual support beams located between each of said rib assemblies and as well as located proximate to and aligned with each of said rib assemblies.

26. The solar tracker assembly of claim 25 wherein each of said secondary support beams are coupled to an inner longitudinal support member and an outer longitudinal support member.

\* \* \* \* \*